Patented Oct. 31, 1939

2,178,174

UNITED STATES PATENT OFFICE 2,178,174

DERIVATIVES OF ALKYLOLAMINES

Morris B. Katzman and Albert K. Epstein, Chicago, Ill., assignors to The Emulsol Corporation, Chicago, Ill.

No Drawing. Application May 17, 1937, Serial No. 143,136

24 Claims. (Cl. 260—403)

Our invention relates to new chemical compounds which have particular utility in the arts where interface modifying functions are required.

One of the objects of our invention is the preparation of new chemical compounds having utility as detergent, emulsifying, flotation and, in general, interface modifying agents in the arts where such functions are desired.

A particular object of our invention resides in the preparation of new chemical compositions of matter which are unusually effective in enhancing the emulsification of oleaginous and aqueous materials.

Still another object of our invention deals with improvements in the preparation of oleaginous and aqueous emulsions generally and particularly cosmetic emulsions such as face creams, cold creams and other creams.

A further object of our invention is concerned with new methods of preparing the novel chemical compositions which are, in part, the subject matter of the present invention.

Other objects and features of the invention will become more apparent as the description proceeds.

In general, our invention is based upon the discovery that if a plurality of groups of a lipophile character, containing the residues of higher molecular weight carboxylic acids or alcohols, particularly higher molecular weight fatty acids and their corresponding alcohols, are attached by means of certain derivatives containing phosphorus and nitrogen, sulphur and nitrogen, or boron and nitrogen, to groups which have a smaller proportion of hydrophile radicals such as hydroxy groups, such compounds have excellent interface modifying properties and are particularly efficacious in the preparation of emulsions wherein oleaginous material such as oil is predominantly the continuous phase and water is the dispersed phase.

By the term "lipophile" as used hereinabove, we mean to designate organic radicals with fatty characteristics. In general, such radicals consist primarily of carbon and hydrogen, although they may include ether and/or ester linkages or other oxygen-containing groups. We have employed this term "lipophile" to denote that the radical so designated has a distinct affinity for hydrocarbons, oils, fats, waxes and other fatty materials, and imparts a tendency to the molecule, of which it is a part, to be wetted by fatty materials.

The term "hydrophile" is used in counter-distinction to the term "lipophile" and is intended to cover radicals consisting primarily of hydrogen and oxygen in the form of hydroxy groups. The hydrophillic character manifests itself by an affinity for water and aqueous media, and the hydrophile radical imparts to the molecule, of which it is a member, a tendency to be wetted by water and aqueous media. The degree or extent of the hydrophillic character is dependent upon the number of hydroxy groups and their location in the molecule, and is also influenced by the number and character of lipophile groups with which they are associated in the molecule.

The word "higher" is employed to mean at least six carbon atoms unless otherwise specifically stated.

More specifically, the compounds of our invention may be prepared by reacting an alkylolamine, such as triethanolamine, with a higher molecular weight carboxylic acid or derivative thereof to form esters of said alkylolamine. The resulting alkylolamine esters are then reacted with certain acid-reacting derivatives of oxygenated phosphorus, oxygenated sulphur, or oxygenated boron compounds containing at least one lipophile group with not less than six carbon atoms.

Among the higher molecular weight carboxylic acids which may be utilized either as such or in the form of derivatives such as acyl halides, esters, particularly triglycerides, anhydrides and the like for reaction with the alkylolamines to produce esters thereof are the following: caproic, capric, caprylic, hydroaromatic acids such as abietic acid, aromatic acids such as benzoic, benzoylbenzoic, naphthoic, toluic, and naphthenic acids, hydroxystearic acid, higher molecular weight saturated and unsaturated fatty acids, particularly those derived from natural fats and oils, such as palmitic acid, stearic, lauric, myristic, melissic, oleic, ricinoleic, linoleic, or mixed higher fatty acids derived from animal or vegetable fats and fish oils such as lard, oleo oil, coconut oil, corn oil, cottonseed oil, soya bean oil, partially or completely hydrogenated vegetable oils such as cottonseed oil, corn oil, sesame oil, and fatty acids of various waxes such as beeswax and carnauba wax.

As stated above, we may, and preferably do, form the esters of the alkylolamines by reaction thereof with triglycerides, the reaction being one of re-esterification and being effected at elevated temperatures, preferably of the order of 200 degrees C. to 250 degrees C. although it is evident that the exact temperature employed will vary depending upon the specific nature of the reacting materials utilized, the speed of reaction desired, and whether or not a re-esterification catalyst is employed. Suitable catalysts of this type are alkaline materials such as sodium hydroxide, potassium hydroxide, alkali metal alcoholates and glycerates such as sodium ethylate and sodium glycerate, soaps such as calcium sodium, potassium and ammonium salts of higher fatty acids, and the like. The catalyst may be dispensed with entirely and excellent results obtained or, if employed, small percentages, of the order of 0.1% to 1.0%, based on the weight of the reacting materials, or even more or less, are very effective.

The triglyceride oils and fats which may be utilized for re-esterification with the alkylolamines are derived from animal and vegetable sources and include the following: cotton-seed oil, coconut oil, corn oil, sesame oil, soya bean oil, lard, oleo oil, sardine oil, fish oils, stearin, and said oils whether partially or completely hydrogenated. We have obtained particularly satisfactory products with coconut oil. Instead of re-esterification of a triglyceride with the alkylolamine, we may employ partially esterified polyhydroxy substances or polyhydric alcohols such as a mono- or di-glyceride of a higher fatty acid as, for example, mono- or di-glycerides of coconut oil fatty acids or of other higher fatty acids, or polyhydroxy substances partially esterified with higher fatty acids such as diethylene glycol mono-higher fatty acid esters. In general, these partially esterified polyhydroxy substances may be represented by the formula

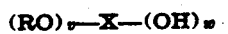

$$(RO)_v\text{---}X\text{---}(OH)_w$$

wherein R is a higher acyl radical, X is the carbon-hydrogen residue of the polyhydroxy substance, and $v$ and $w$ are small whole numbers. The polyhydroxy substances, the carbon-hydrogen residues of which are represented by X in the above general formula, include glycerol, glycols, polyglycerols, polyglycols, sugars, sugar alcohols, hydroxycarboxylic acids and the like. In general, when such compounds are employed in the re-esterification reaction with the alkylolamines, as described above, lower temperatures can be effectively employed. This appears to be particularly the case where the re-esterification is carried out in the presence of steam as hereinafter described. Thus, for example, in re-esterifying monostearin with commercial triethanolamine temperatures of about 150 degrees C. have been found very suitable and, when operating in an atmosphere of steam, the reaction appears to proceed well at a temperature even as low as about 135 degrees C. It will be appreciated, however, that the temperature of reaction will vary to some extent since some compounds are inherently more reactive than others. The disclosure herein of temperature ranges is, therefore, to be taken as illustrative or descriptive and in no sense limitative.

The alkylolamines which we employ are varied and include ethanolamines such as monoethanolamine, diethanolamine, triethanolamine, and mixtures thereof such as are present in commercial triethanolamine; propanol amines, butanolamines, pentanolamines, hexanolamines, glycerol amines, and mixtures thereof, as, for example:

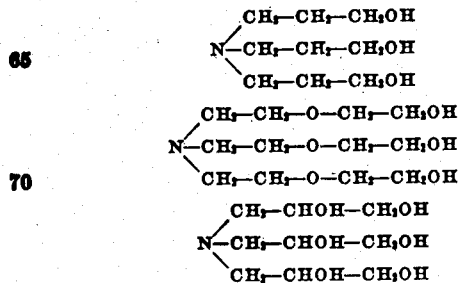

Because of commercial availability at the present time and because of the particularly satisfactory results obtained, we prefer to utilize commercial triethanolamine which contains minor amounts of mono- and di-ethanolamine.

In the light of the foregoing, it will be understood that we initially produce higher carboxylic esters of alkylolamines, as described above, and preferably by re-esterifying a triglyceride oil or fat, for example, coconut oil, with an alkylolamine, such as triethanolamine. The resulting ester is then reacted with certain acid-reacting oxygenated phosphorus, oxygenated sulphur, or oxygenated boron compounds containing a lipophile group with at least six carbon atoms, hereinafter described in detail, preferably at temperature of 100 degrees C. or less, to produce the products of our invention. The temperature limitation for this latter reaction is the practical one, namely, that a temperature should be employed below that at which decomposition of any of the reacting constituents or of the ultimate product takes place. In general, the sulphuric acid esters are reacted at lower temperatures than the phosphoric or pyrophosphoric acid esters.

The oxygenated phosphorus compounds which may be employed for this purpose are acid-reacting phosphoric acid esters of higher molecular weight alkyl or acyl derivatives of polyhydroxy substances, such as the meta-, ortho-, pyro-, and tetra-phosphoric acid esters of monostearin and mono-olein, pyrophosphoric acid ester of diethylene glycol monolaurate, and similar compounds containing free hydroxy groups, in which the hydrogen thereof is acidic, attached to phosphorus. For a more complete disclosure of numerous compounds which may be employed for reaction with the alkylolamine esters, reference may be had to United States Patents Nos. 2,026,785 and 2,025,029; to the copending application of Benjamin R. Harris, Serial No. 106,194, filed October 17, 1936; and to the copending application of Morris B. Katzman, Serial No. 135,931, filed April 9, 1937. It will be understood that, for the purposes of our present invention, the unneutralized or partially neutralized phosphoric acid esters are employed.

Instead of utilizing oxygenated phosphorus derivatives as described above, the corresponding acid reacting sulphur derivatives may be effectively employed. These substances include monostearin sulphate, coconut oil mono fatty acid esters of diethylene glycol sulphate, and the like, and are quite fully disclosed in United States Patents Nos. 2,023,387 and 2,006,309. It will be understood that, as in connection with the oxygenated phosphorus derivatives, the unneutralized or partially neutralized compounds are employed.

Again, in place of either the oxygenated phosphorus or oxygenated sulphur compounds, similar as well as corresponding acid-reacting oxygenated boron compounds may be employed. These include, among others, boric acid esters of monoglycerides of higher fatty acids such as monostearin borate. For a more complete description of such or similar compounds, reference may be had to United States Patent No. 2,052,192.

The acid-reacting oxygenated phosphorus, oxygenated sulphur, and oxygenated boron compounds which we employ herein may be represented by the general formula

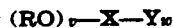

$$(RO)_v\text{---}X\text{---}Y_w$$

wherein R is a member selected from the group consisting of alkyl and acyl radicals containing at least six carbon atoms, X is the residue of an aliphatic polyhydroxy substance, Y is a member selected from the group consisting of oxygenated phosphorus, oxygenated sulphur, and oxygenated boron radicals which is attached to the polyhydroxy substance through an ester linkage, and $v$ and $w$ are small whole numbers.

We have obtained unusually satisfactory results with, and, therefore, prefer to employ the unneutralized or partially neutralized pyrophosphoric acid esters of higher fatty acid monoglycerides, particularly of monoglycerides wherein the fatty acid radical contains between 12 and 18 carbon atoms.

The following examples are illustrative of specific embodiments of our invention. It will be understood that they are given by way of example only, in order that those skilled in the art will have a clearer picture of how the invention may be successfully practiced, and are not to be construed as limiting our invention in any way. Thus, for example, the proportions of reacting materials, the temperature and length of time of the reaction, and other conditions may be varied without departing from the scope of our invention as defined in the appended claims.

Example I 300 grams of coconut oil, 300 grams of commercial triethanolamine, and 0.6 gram of potassium hydroxide were mixed together and heated with stirring for about 45 minutes at 250 degrees C. or until the reaction mixture became homogeneous.

To 20 parts by weight of the resulting product, cooled to about 80 degrees C. to 100 degrees C., there were added 10 parts by weight of monostearin pyrophosphate previously prepared by reacting 19 parts by weight of commercial monostearin with 4½ parts by weight of pyrophosphoric acid at 90 degrees C., with stirring. The monostearin pyrophosphate was added to the product from the previous step of the process at about 90 degrees C. and stirred until cool. The resulting product, upon cooling, showed excellent emulsifying and other interface modifying properties.

Example II 50 parts, by weight, of a partially hydrogenated cottonseed oil having a melting point of about 100 degrees F. were admixed with 50 parts, by weight, of commercial triethanolamine and 0.1% of sodium glycerate, based on the weight of the cottonseed oil, was added. The mixture was heated to 240 degrees C. for about 40 minutes.

To 25 parts by weight of the resulting product, cooled to 90 degrees C., there were added 10 parts by weight of the pyrophosphoric acid ester of diethylene glycol mono laurate, previously heated to 90 degrees C., and the mixture was stirred until cool.

The resulting product, upon cooling, had good interface modifying properties, particularly as an emulsifying agent.

Example III 200 parts by weight of lard, 200 parts by weight of commercial triethanolamine, and 0.4 part by weight of sodium glycerate were admixed and heated to a temperature of 250 degrees C. for a period of one hour.

To 20 parts by weight of the resulting product, cooled to 90 degrees C., there were added 10 parts by weight of monostearin sulphate, previously heated to 90 degrees C., and the mixture was stirred until cool.

The resulting product, upon cooling, had good interface modifying properties.

Example IV 220 parts, by weight, of a mixture of higher fatty acid monoglycerides and diglycerides prepared by reesterifying partially hydrogenated cottonseed oil having a melting point of 100 degrees F., were mixed with 180 parts, by weight, of commercial triethanolamine and with 0.4 part of sodium stearate, and the resulting mixture was heated to 150 degrees C. and maintained at that temperature for 40 minutes.

To 20 parts of the resulting reaction product, at a temperature of 90 degrees C., there were added 15 parts of monostearin pyrophosphate, previously heated to 90 degrees C., and the resulting mixture stirred until cool.

The ultimate product had excellent interface modifying properties.

Instead of proceeding as described above, the order of the steps may be reversed. Thus, for example, the acid-reacting oxygenated sulphur, oxygenated phosphorus, or oxygenated boron compound can initially be reacted with the alkylolamine at temperatures in the neighborhood of 90 degrees C. or 100 degrees C. and the resulting product then reacted with a higher acyl halide corresponding to any of the higher carboxylic or higher fatty acids mentioned above, such as lauroyl chloride, stearoyl chloride or acyl halides of coconut oil mixed fatty acids. If desired, the reaction may be carried out in the presence of pyridine, quinoline or some other suitable alkaline material or amine to neutralize or take up the hydrochloric acid which forms in the reaction. In the event that an alkaline material is utilized, as indicated, the final product may be washed free of the neutralized base with water. The amount of acyl halide employed determines the number of acyl groups present in the final product and this can be controlled as desired. The following example illustrates this aspect of our invention:

Example V 100 grams of monostearin pyrophosphate, prepared as described hereinabove in Example I, were mixed with 94 grams of commercial triethanolamine and the mixture was heated at 90 degrees C. until it was homogeneous.

To the mixture, as thus produced, 140 grams of lauroyl chloride were added dropwise with constant stirring and the temperature was maintained at 90 degrees C. to 100 degrees C. until the reaction was complete and the hydrochloric acid formed in the reaction removed.

The final product was a white, semi-solid mass and had excellent properties as an emulsifying agent, particularly for cosmetic emulsions.

As described above, the compounds of our invention, among other valuable properties which they possess, are excellent emulsifying agents, particularly for water-in-oil emulsions. The following examples are illustrative of such use, the parts referred to being by weight.

Example A

To make a cosmetic cream, approximately 5 parts of the reaction product produced in accordance with Example I, as described above, were dissolved in 15 parts of petroleum jelly. To this mixture, 40 parts of a light mineral oil heated to 40 degrees C. were added. Then, while constantly stirring, 40 parts of water at 40 degrees C. were gradually added and the stirring was continued until the mass became cool. The resulting emulsion possessed good stability even under adverse conditions of temperature and handling.

*Example B*

To make a furniture polish, 5 parts of the reaction product of Example II, as described above, were mixed with 5 parts carnauba wax and 50 parts of a light mineral oil. This mixture was heated to 50 degrees C., until dissolution or dispersion of the ingredients took place and then 40 parts of water at 40 degrees C. were added slowly with constant stirring until the mixture became cool. A smooth emulsion having excellent stability against separation of phases was obtained.

In general, the compounds made in accordance with our invention, as described above, possess a dark color. While this does not affect the chemical properties thereof, for certain purposes, as in white cosmetic creams, this dark color offers certain objections. We have found that this undesirable color can be eliminated so that products having a pale, yellow or straw color are produced having wide utility in the arts where interface modifying functions are desired. We accomplish this result by carrying out the esterification or reesterification reaction in the presence of steam, preferably under reduced pressure, followed by quick cooling after the completion of the reaction. In practice, we have found that the utilization of steam during the reaction, which may be carried out at a temperature of 250 degrees C. or higher or lower and at atmospheric pressure or at a reduced pressure of about 10 mm. to 70 mm. of mercury (absolute) during the reesterification reaction produces excellent results, the steam being passed into the reaction mixture below the level thereof in the reaction vessel. It will be appreciated, of course, that the reaction temperature and the reduced pressure, if employed, may be varied within limits which will be appreciated by those skilled in the art without departing from the spirit of our invention. The quick cooling is effected in the presence of steam and may be very satisfactorily carried out by continuing the passage of steam through the reaction mass after the completion of the reaction and simultaneously cooling the reaction vessel by contact with ice or by the use of cooling coils. When the reaction mass cols down to a temperature of approximately 125 degrees C., the steam may be shut off and the cooling continued. For a more complete description of this phase of our invention, reference may be had to our copending application, Serial No. 143,135, filed of even date herewith.

The term "residue" is employed in its ordinarily accepted sense to connote that which remains after the reaction of certain groups. Thus, for example, when glycerine, a polyhydroxy substance, is reacted with a fatty acid, such as lauric acid, to produce a mono-ester, and is then treated with sulphuric acid or the like to produce monolaurin mono-sulphate, the residue of the polyhydroxy substance is

What we claim as new and desire to protect by Letters Patent of the United States is:

1. The process which comprises reacting an alkylolamine with a member of the group consisting of higher fatty acids containing at least six carbon atoms and such derivatives thereof as are capable of forming esters to produce esters of said alkylolamines, and then reacting the resulting product with an acid-reacting substance corresponding to the following general formula $$(RO)_v-X-Y_w$$

wherein R is a member selected from the group consisting of alkyl and acyl radicals containing at least six carbon atoms, X is the residue of an aliphatic polyhydroxy substance, Y is a member selected from the group consisting of oxygenated phosphorus, oxygenated sulphur, and oxygenated boron radicals which is attached to the polyhydroxy substance through an ester linkage, and $v$ and $w$ are small whole numbers.

2. The process of claim 1 wherein the acid-reacting substance corresponds to the following general formula $$(RO)_v-X-Y_w$$

wherein R is a member selected from the group consisting of alkyl and acyl radicals containing at least six carbon atoms, X is the residue of a polyhydroxy substance selected from the group consisting of glycerol, glycols, polyglycerols, polyglycols, sugars, sugar alcohols, and hydroxycarboxylic acids, Y is a member selected from the group consisting of oxygenated phosphorus, oxygenated sulphur, and oxygenated boron radicals, and $v$ and $w$ are small whole numbers.

3. The process of claim 1 wherein the acid-reacting substance is a phosphoric acid ester of a higher fatty acid monoglyceride.

4. The process of claim 1 wherein the acid-reacting substance is a pyrophosphoric acid ester of a monoglyceride of a fatty acid containing between 12 and 18 carbon atoms.

5. The process which comprises re-esterifying a material selected from the group consisting of triglyceride oils and fats with an alkylolamine at a temperature of about 200 degrees C. to about 250 degrees C., and then reacting the resulting product with an acid-reacting substance corresponding to the general formula $$(RO)_v-X-Y_w$$

wherein R is a member selected from the group consisting of alkyl and acyl radicals containing at least six carbon atoms, X is the residue of an aliphatic polyhydroxy substance, Y is a member selected from the group consisting of oxygenated phosphorus, oxygenated sulphur, and oxygenated boron radicals which is attached to the polyhydroxy substance through an ester linkage, and $v$ and $w$ are small whole numbers.

6. The process of claim 5 wherein the acid-reacting substance is a phosphoric acid ester of a higher fatty acid monoglyceride.

7. The process of claim 5 wherein the acid-reacting substance is a pyrophosphoric acid ester of a monoglyceride of a fatty acid containing between 12 and 18 carbon atoms.

8. The process of claim 1 wherein the alkylolamine is a member of the group consisting of monoethanolamine, diethanolamine, triethanolamine, and mixtures thereof.

9. The process of claim 5 wherein the alkylolamine is a member of the group consisting of monoethanolamine, diethanolamine, triethanolamine, and mixtures thereof.

10. The process of claim 1 wherein the higher fatty acids are coconut oil fatty acids.

11. The process of claim 5 wherein the triglyceride oil is coconut oil.

12. The process which comprises reesterifying about 10 parts by weight of coconut oil with an approximately equal amount by weight of triethanolamine at a temperature between about 230 degrees C. and 250 degrees C., allowing the reaction mass to cool to about 100 degrees C. or less, and then admixing therewith about 10 parts of an acid-reacting pyrophosphoric acid ester of monostearin and reacting the mixture at a temperature of about 100 degrees C. or less.

13. The process which comprises reacting an alkylolamine with a member of the group consisting of higher molecular weight carboxylic acids containing at least six carbon atoms and such derivatives thereof as are capable of producing esters to produce esters of said alkylolamines, and then reacting the resulting product with an acid-reacting substance corresponding to the general formula $$(RO)_v-X-Y_w$$

wherein R is a member selected from the group consisting of alkyl and acyl radicals containing at least six carbon atoms, X is the residue of an aliphatic polyhydroxy substance, Y is a member selected from the group consisting of oxygenated phosphorus, oxygenated sulphur, and oxgenated boron radicals which is attached to the polyhydroxy substance through an ester linkage, and $v$ and $w$ are small whole numbers.

14. The reaction product of a higher fatty acid ester of an alkylolamine, the fatty radical of said ester containing at least six carbon atoms, and an acid-reacting chemical compound corresponding to the general formula $$(RO)_v-X-Y_w$$

wherein R is a member selected from the group consisting of alkyl and acyl radicals containing at least six carbon atoms, X is the residue of an aliphatic polyhydroxy substance, Y is a member selected from the group consisting of oxygenated phosphorus, oxygenated sulphur, and oxygenated boron radicals which is attached to the polyhydroxy substance through an ester linkage, and $v$ and $w$ are small whole numbers.

15. The reaction product of a higher fatty acid ester of an alkylolamine and an acid-reacting phosphoric acid ester of a higher fatty acid monoglyceride, the higher fatty acid radicals of the ester and the monoglyceride each containing at least six carbon atoms.

16. The reaction product of a higher fatty acid ester of an alkylolamine, the fatty acid radical of which contains at least six carbon atoms, and an acid-reacting pyrophosphoric acid ester of a monoglyceride of a fatty acid containing between 12 and 18 carbon atoms.

17. The product of claim 14 wherein the alkylolamine is a member of the group consisting of monoethanolamine, diethanolamine, triethanolamine, and mixtures thereof.

18. The product of claim 15 wherein the alkylolamine is a member of the group consisting of monoethanolamine, diethanolamine, triethanolamine, and mixtures thereof.

19. The reaction product of an acid-reacting phosphoric acid ester of a higher fatty acid monoglyceride, the fatty acid radical of which contains at least six carbon atoms, and the mixture resulting from the reesterification of a material selected from the group consisting of triglyceride oils and fats and an alkylolamine.

20. The reaction product of an acid-reacting pyrophosphoric acid ester of a monoglyceride of a fatty acid containing between 12 and 18 carbon atoms and the mixture resulting from the reesterification of coconut oil and triethanolamine.

21. The process which comprises preliminarily admixing an alkylolamine with an acid-reacting substance corresponding to the general formula $$(RO)_v-X-Y_w$$

wherein R is a member selected from the group consisting of alkyl and acyl radicals containing at least six carbon atoms, X is the residue of an aliphatic polyhydroxy substance, Y is a member selected from the group consisting of oxygenated phosphorus, oxygenated sulphur, and oxygenated boron radicals which is attached to the polynydroxy substance through an ester linkage, and $v$ and $w$ are small whole numbers, and then reacting the resulting mixture with a carboxylic acyl halide containing at least six carbon atoms.

22. The process of claim 21 wherein the alkylolamine comprises essentially triethanolamine, the acid-reacting substance comprises essentially monostearin pyrophosphate, and the acyl halide is derived from a fatty acid containing between 12 and 18 carbon atoms.

23. The reaction product of a higher molecular weight carboxylic acyl halide, the acyl radical of which contains at least six carbon atoms, with a mixture of an alkylolamine and an acid-reacting substance corresponding to the general formula $$(RO)_v-X-Y_w$$

wherein R is a member selected from the group consisting of alkyl and acyl radicals containing at least six carbon atoms, X is the residue of an aliphatic polyhydroxy substance, Y is a member selected from the group consisting of oxygenated phosphorus, oxygenated sulphur, and oxygenated boron radicals which is attached to the polyhydroxy substance through an ester linkage, and $v$ and $w$ are small whole numbers.

24. The process which includes interacting an alkylolamine, a carboxylic acyl-containing compound having at least six carbon atoms and being capable of forming esters with the alkylolamine, and an acid-reacting substance corresponding to the general formula $$(RO)_v-X-Y_w$$

wherein R is a member selected from the group consisting of alkyl and acyl radicals containing at least six carbon atoms, X is the residue of an aliphatic polyhydroxy substance, Y is a member selected from the group consisting of oxygenated phosphorus, oxygenated sulphur, and oxygenated boron radicals which is attached to the polyhydroxy substance through an ester linkage, and $v$ and $w$ are small whole numbers, the acyl-containing compound reacting with the alkylolamine to produce an ester thereof.

MORRIS B. KATZMAN.
ALBERT K. EPSTEIN.